United States Patent
Mar et al.

[19]

[11] Patent Number: 5,941,600

[45] Date of Patent: Aug. 24, 1999

[54] METHOD AND APPARATUS FOR MOUNTING ARTICLES TO A VEHICLE FLOOR

[75] Inventors: William Mar, Clinton Township; Adrian L. Ashcroft, Highland; Gary Bityk, Royal Oak; Gregory A. Beecher, Madison Heights, all of Mich.

[73] Assignee: Chrysler Corporation, Auburn Hills, Mich.

[21] Appl. No.: 08/749,307

[22] Filed: Nov. 14, 1996

[51] Int. Cl.[6] .................................................... A47C 1/08
[52] U.S. Cl. ................. 297/250.1; 297/254; 248/231.61; 248/499; 248/503.1; 296/68.1
[58] Field of Search .................................... 248/500, 503, 248/503.1, 505, 231.61, 499; 297/250.1, 252, 256.16, 254; 296/68.1

[56] References Cited

U.S. PATENT DOCUMENTS

| | | |
|---|---|---|
| 2,664,140 | 12/1953 | Kindelberger . |
| 3,207,552 | 9/1965 | Loughney, Jr. .................. 297/250.1 X |
| 3,380,775 | 4/1968 | Offenbacker ............................. 297/385 |
| 4,099,770 | 7/1978 | Elsholz et al. ........................... 297/216 |
| 4,183,580 | 1/1980 | Johansson ......................... 248/503.1 X |
| 4,195,879 | 4/1980 | Miller ....................................... 297/184 |
| 4,583,253 | 4/1986 | Hall . |
| 4,681,368 | 7/1987 | Heath et al. .......................... 297/250.1 |
| 4,687,255 | 8/1987 | Klanner et al. .......................... 297/488 |
| 4,688,843 | 8/1987 | Hall ......................................... 248/503.1 |
| 4,729,602 | 3/1988 | Tokugawa ................................ 297/468 |
| 4,754,946 | 7/1988 | Constantin ............................ 248/503.1 |
| 4,775,126 | 10/1988 | Yokoyama ............................... 248/430 |
| 4,822,104 | 4/1989 | Plesniarski .............................. 297/468 |
| 4,874,203 | 10/1989 | Henley ................................... 297/250.1 |
| 4,978,097 | 12/1990 | Froutzis ............................... 248/503.1 |
| 4,989,816 | 2/1991 | Lamarche ........................... 248/231.61 |
| 5,102,197 | 4/1992 | Itsuki ....................................... 297/468 |
| 5,318,339 | 6/1994 | Cherniak ............................. 297/344.26 |
| 5,332,285 | 7/1994 | Sinnhuber ............................. 297/250.1 |
| 5,335,968 | 8/1994 | Sheridan et al. ..................... 297/250.1 |
| 5,383,708 | 1/1995 | Nagasaka et al. ................... 297/250.1 |
| 5,487,588 | 1/1996 | Burleigh et al. ................. 297/250.1 X |

Primary Examiner—Derek J. Berger
Attorney, Agent, or Firm—William J. Coughlin

[57] ABSTRACT

A method and apparatus for mounting an article such as a child seat tether to a vehicle floor comprising a mounting bar, first and second mounting brackets connected to the mounting bar, the brackets capable of connecting to preexisting seat attachment points of a vehicle floor, a plurality of tether attachment points on the mounting bar, and a mounting bar attachable to any of the attachment points.

11 Claims, 5 Drawing Sheets

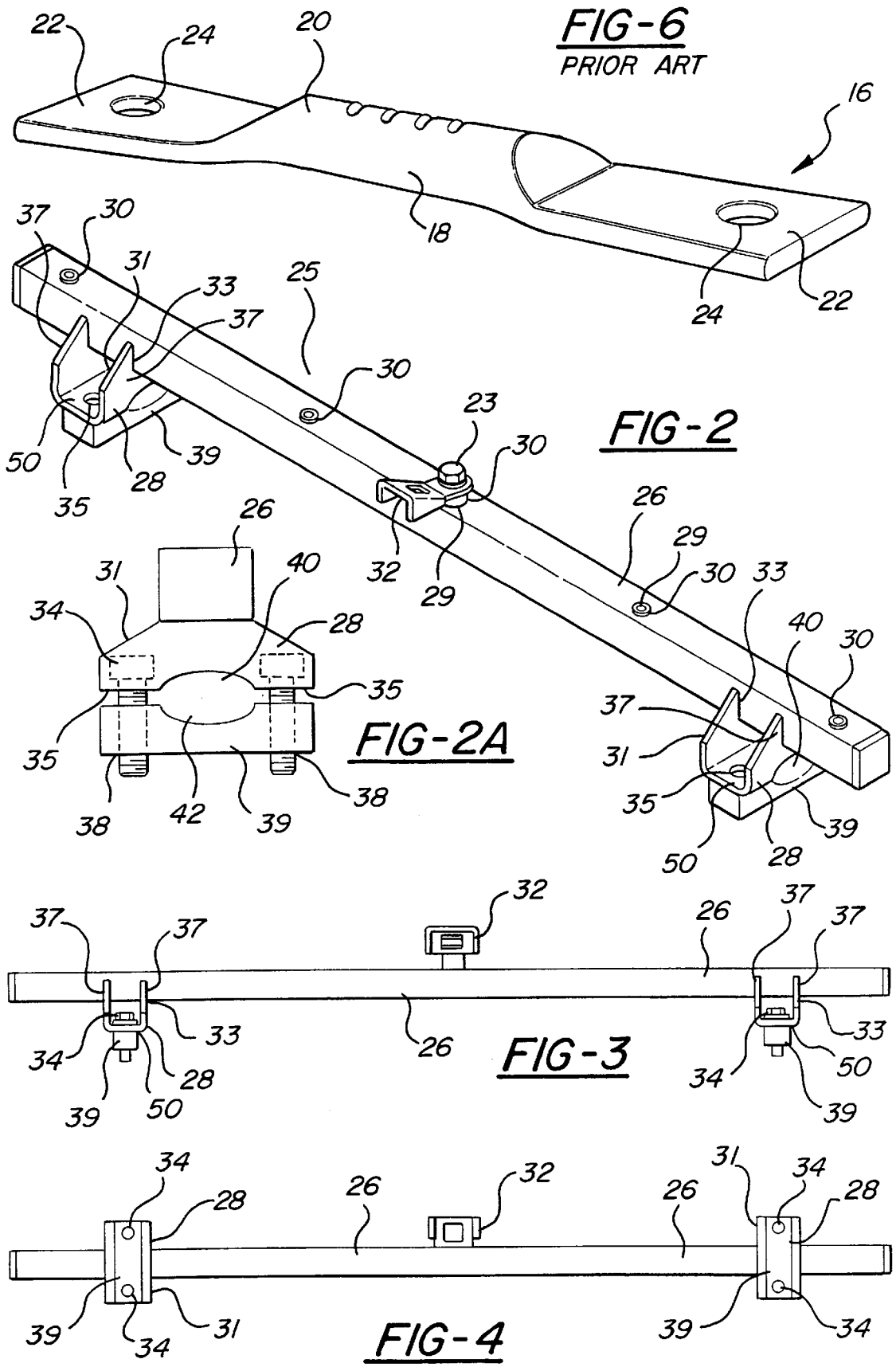

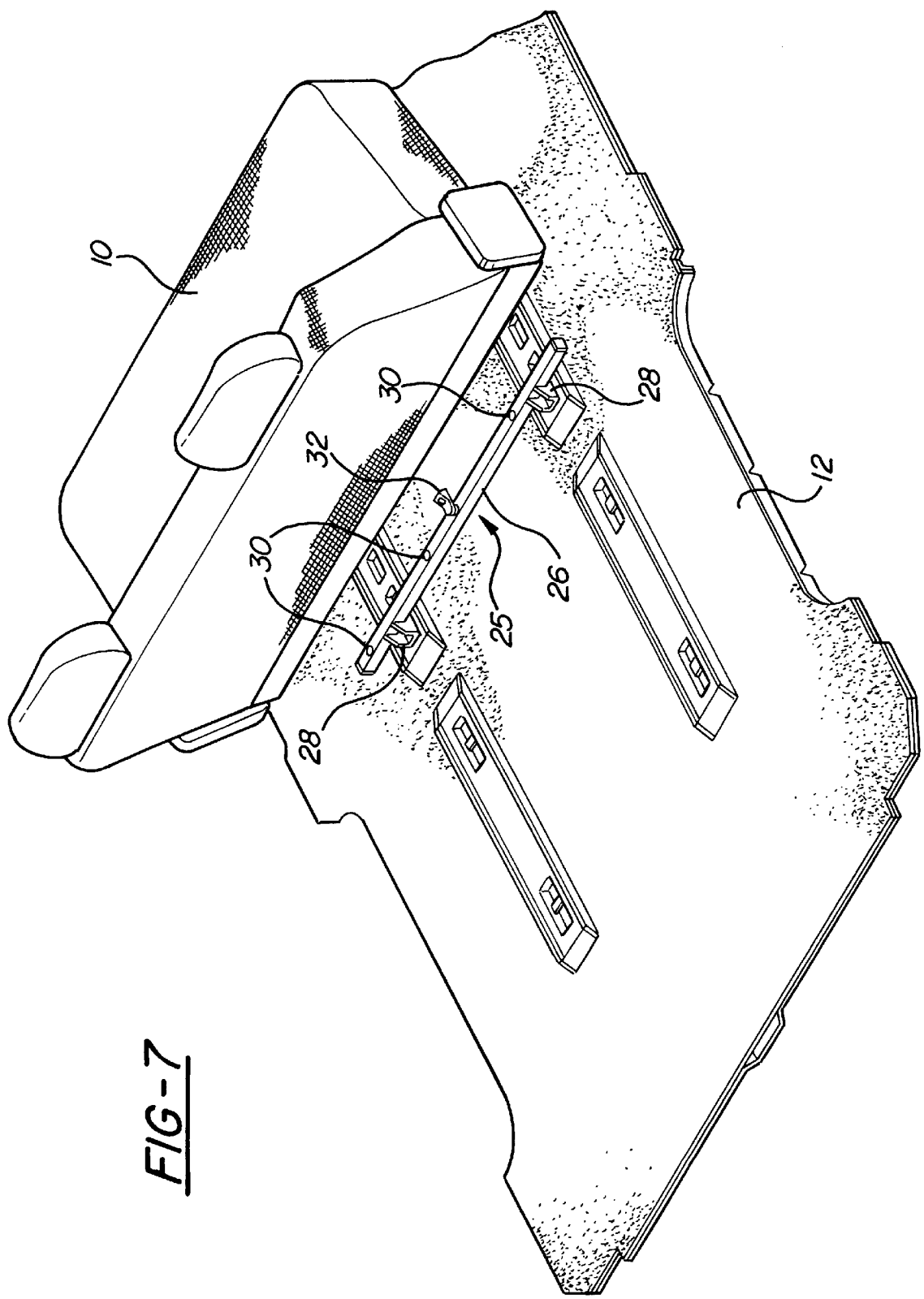

METHOD AND APPARATUS FOR MOUNTING ARTICLES TO A VEHICLE FLOOR

BACKGROUND OF THE INVENTION

1. Field of the Invention

The present invention relates generally to mounting articles to the floors of vehicles and, more particularly, comprises a method and apparatus for mounting various articles such as a child safety seat tether to the floor of a vehicle using existing attachment points.

2. Related Art

Certain countries such as Australia require that child safety seats be equipped with a tether at the top of the seat that comes down behind the vehicle seat on which the child safety seat is mounted, and which then is attached to the vehicle to additionally secure the child safety seat. Various attachment points have been used for mounting the vehicle end of such a tether, including the floor, rear sill, and upper headers of the vehicle. Such mounting points are disadvantageous because they require that additional holes be provided in the body-in-white of the vehicle, as well as attendant additional reinforcement to the penetrations, adding to manufacturing costs and complexity of the vehicle.

SUMMARY OF THE INVENTION

Accordingly, it is an object of the present invention to provide a method and apparatus for mounting an apparatus such as a child safety seat tether to a vehicle floor via existing attachment points in the vehicle. It is another object of the present invention to provide a method and apparatus for mounting a variety of articles to a vehicle floor. It is yet another object of the present invention to provide a method and apparatus for mounting an apparatus to a vehicle floor that can be removed from the vehicle when the article, such as the child safety seat, is not in use.

Accordingly, disclosed and claimed herein is a method and apparatus for mounting an article such as a child safety seat tether to a vehicle floor using currently existing seat attachment points, saving the need for additional penetrations in the body-in-white and additional reinforcements of the penetrations. More particularly, the method and apparatus of the present invention allows use of attachment points that exist in the vehicle for mounting the vehicle seats. The apparatus of the present invention comprises a mounting bar, first and second mounting brackets connected to the mounting bar, the brackets capable of connecting to preexisting seat attachment points of a vehicle floor. It further comprises a plurality of tether attachment points on the mounting bar, the tether attachment points in the preferred embodiment comprising holes defined by the mounting bar. The present invention further comprises tether retaining means in the form of a loop attachable to one of the attachment points. Also disclosed are mounting brackets further comprising an upper member, a lower member and a plurality of bolts for connecting the members. Also disclosed are mounting brackets in which the upper member defines a groove and the lower member defines a groove such that when the upper and lower members are connected a generally oval shape is formed.

The details of the present invention, both as to its structure and operation, can best be understood by reference to the accompanying drawings in which like reference numbers refer to like parts and in which:

DESCRIPTION OF THE DRAWINGS

FIG. 2 shows a perspective view of the apparatus of the present invention;

FIG. 2A shows a partially cut-away partially exploded perspective view of a portion of FIG. 2;

FIG. 3 shows a rear view of the apparatus of the present invention;

FIG. 4 shows a bottom view of the apparatus of the present invention;

FIG. 6 shows a perspective view of the seat striker of the apparatus of the present invention;

FIG. 7 shows a perspective view of the apparatus of the present invention installed in a vehicle;

DETAILED DESCRIPTION OF THE INVENTION

Figure 1:
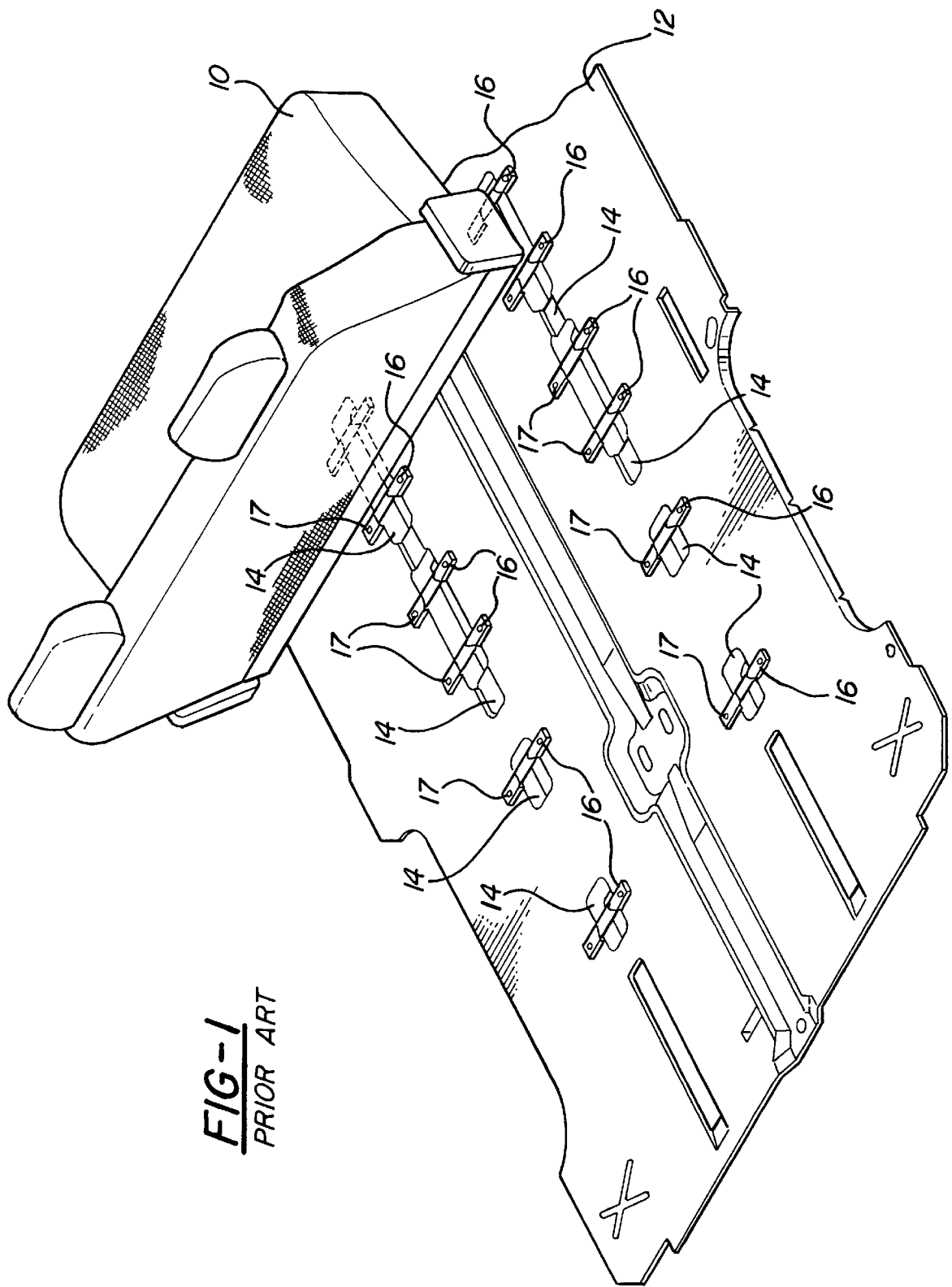
FIG. 1 shows typical vehicle seat attachment points with which the apparatus and method of the present invention is used.
Figure 5:
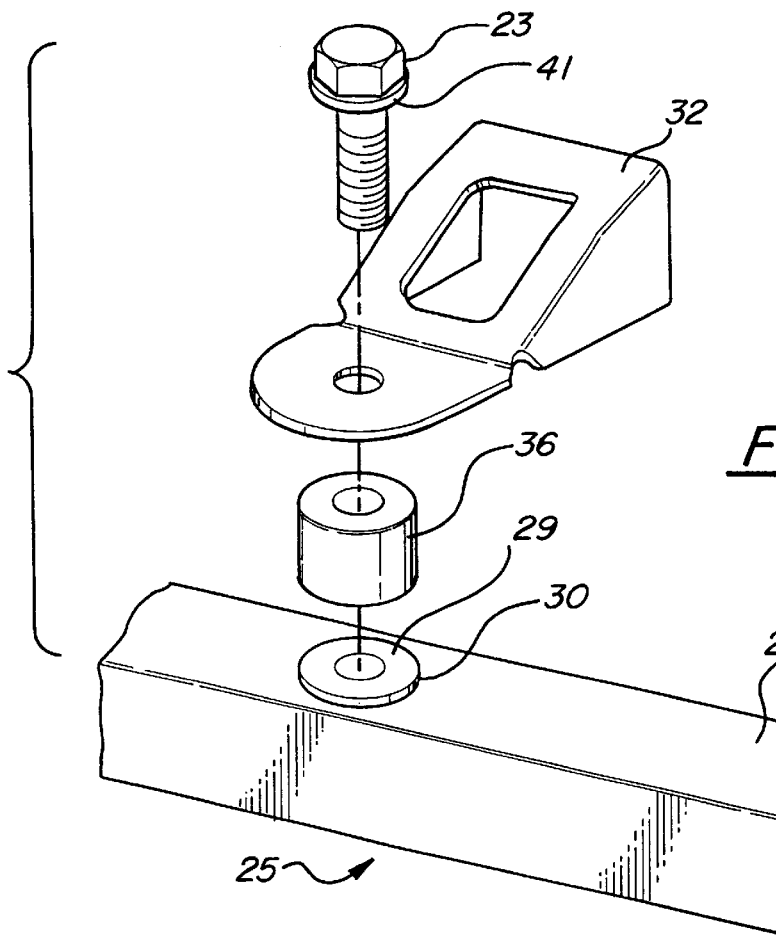
FIG. 5 shows a partially exploded view of a portion of the apparatus of the present invention.

Turning to FIG. 1, a typical mounting scheme for a removable bench seat such as that found in a Chrysler minivan is shown. Seat 10 is a conventional removable bench seat, and is attachable to vehicle floor 12. Vehicle floor 12 defines a plurality of recesses 14 into which seat strikers 16 (see FIG. 6) are bolted. Seat striker 16 comprises body 18, central portion 20 and end portions 22 defining bolt holes 24. When installed, end portions 22 of seat strikers 16 lie beneath carpet (not shown) lying over the vehicle floor and are bolted to the vehicle floor on either side of recesses 14. Seat strikers 16 are bolted to vehicle floor 12 via bolts 17 passing through bolt holes 24. Central portions 20 lie over recesses 14 to provide a plurality of attachment points for connection of seat 10. As seen in FIG. 1, a plurality of such attachment points typically are provided to allow seats to be placed in various configurations within the vehicle. It should be noted that the apparatus of the present invention may be used with other seat striker constructions and is not limited to use with this type of a seat striker.

Turning to FIG. 2 through FIG. 5, the apparatus of the present invention is shown. Mounting means 25 comprising mounting bar 26 is connected to mounting brackets 28, which typically are welded to the mounting bar via upper member 31. Bar 26 defines a plurality of tether attachment points 30, preferably holes defined by the bar. Tether retaining means 32, which in the preferred embodiment comprises a loop, is attached to bar 26 at one of the attachment points and may be moved between the attachment points. One or more tethers additionally may be used via one or more attachment points, as desired. In the preferred embodiment shown the point of attachment is adjustable by removing and reinstalling bolt 23 which threadably engages inserts 29 of holes 52 (see FIG. 5). Spacer 36 raises the loop from the mounting bar 26 and is secured in place by bolt 23 and locking washer 41.

In the preferred embodiment mounting brackets 28 further comprise upper members 31 and lower members 39, which are connected by bolts 34 passing through holes 35 and 38. In the preferred embodiment upper member 31 is a generally wedge shaped member with parallel flanges 37 defining notches 33 for receiving the mounting bar and a flat bottom surface 50 defining holes 35 through which bolts 34 pass.

Preferably the upper and lower members define sets of matching upper and lower grooves 40 and 42 which when placed together form a generally oval shape for engagement of an attachment point of a vehicle floor, such as body 18.

Figure 8:
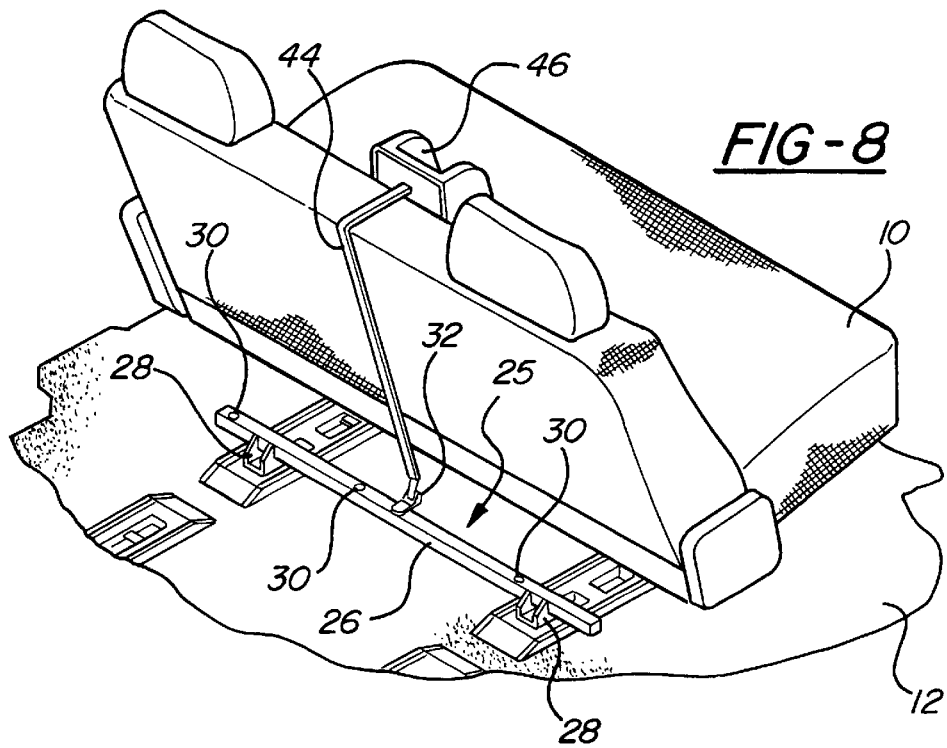
FIG. 8 shows a perspective view of the apparatus of the present invention in use with a child safety seat installed on a bench type seat.
Figure 9:
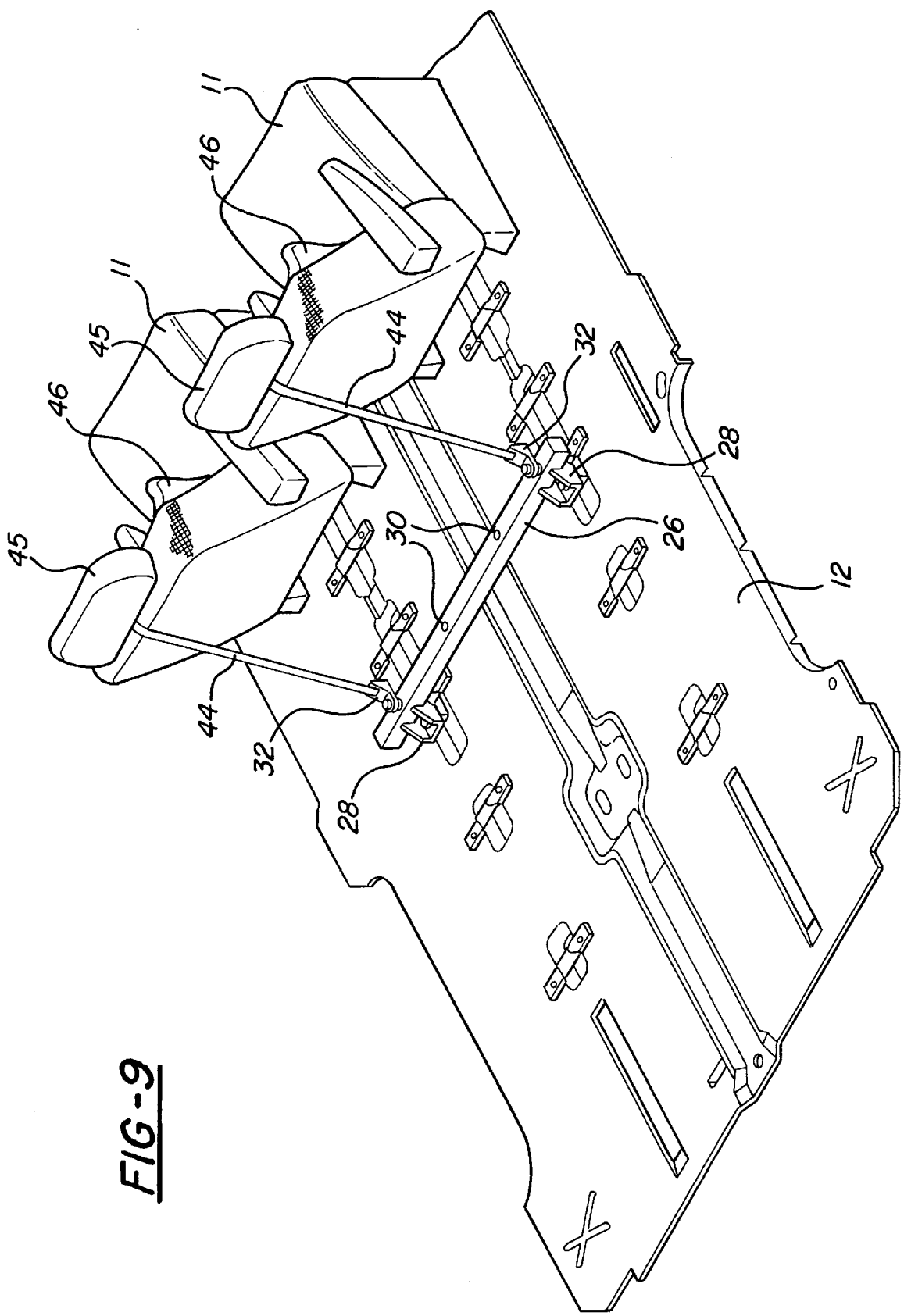
FIG. 9 shows a perspective of the apparatus of the present invention in use with a child safety seat installed on a bucket type seat.

Turning to FIG. 7, FIG. 8, and FIG. 9, the apparatus of the present invention is shown installed on a vehicle floor. As can be seen, mounting means 25 is mounted on seat strikers (not shown) via mounting brackets 28. To secure the mounting to the vehicle floor (see also FIG. 2A), lower member 39 of mounting bracket 28 is placed below the seat striker, with lower groove 42 engaging the seat striker. The mounting means is then placed over the seat striker with upper grooves 40 of upper members 31 of mounting brackets 28 engaging the tops of the seat strikers. Bolts 34 then are fastened to connect the upper and lower members. Tether 44 (see FIG. 8) extends from the top of child safety seat 46, and is attached to loop 32. As FIG. 8 and FIG. 9 show, the present invention can be used with a variety of different types of seats. FIG. 8 shows use with a bench type seat; FIG. 9, a bucket type seat. In FIG. 9 tethers 44 pass under headrests 45 of bucket seats 11 to retain child safety seats 46. FIG. 9 also shows use of the apparatus of the present invention with multiple tethers.

The method and apparatus of the present invention also may be used to secure other articles to vehicle floors using the same mounting bracket apparatus. For example, the mounting brackets of the present invention can be connected to such devices as storage containers, tool boxes, bicycle racks, or other sporting equipment and the like to make use of existing vehicle attachment points for securing articles, and thereby achieve the same advantages. The present invention allows use of existing mounting parts and removal when attachment is no longer desired.

While particular embodiments of the invention have been described above, the invention is not so limited. Alternative embodiments and modification which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

We claim:

1. A child seat tether system comprising:

a child safety seat;

a mounting bar;

first and second mounting brackets connected to said mounting bar, said brackets capable of connecting to preexisting seat attachment points of a vehicle floor, said mounting brackets each including an upper member, a lower member and a plurality of bolts for connecting said members;

a plurality of tether attachment points on said mounting bar; and tether retaining means for attachment to said child safety seat by a tether and attachable to any of said tether attachment points, said child safety seat thereby operatively connected to said bar;

wherein each said upper member defines a groove and each said lower member defines a groove such that when said upper member and said lower member are connected a generally oval shape is formed.

2. The child seat tether mounting means of claim 1 wherein said tether attachment points further comprise holes defined by said mounting bar.

3. The child seat tether mounting means of claim 1 wherein said tether retaining means further comprises a loop.

4. A child seat tether system comprising:

a child safety seat;

a mounting bar;

first and second mounting brackets connected to said mounting bar, said brackets capable of connecting to preexisting seat attachment points of a vehicle floor, said mounting brackets each including an upper member, a lower member and a plurality of bolts for connecting said members;

a plurality of tether attachment points on said mounting bar, said tether attachment points further comprising holes defined by said mounting bar; and tether retaining means for attachment to said child safety seat by tether and attachable to any of said tether attachment points, said seat operatively connected to said bar;

wherein each said upper member defines a groove and each said lower member defines a groove such that when said upper member and said lower member are connected a generally oval shape is formed.

5. The child seat tether mounting means of claim 4 wherein said tether retaining means further comprises a loop.

6. A child seat tether system comprising:

a child safety seat;

a mounting bar;

first and second mounting brackets connected to said mounting bar, said brackets capable of connecting to preexisting seat attachment points of a vehicle floor, said mounting brackets each further comprising an upper member, a lower member and a plurality of bolts for connecting said members;

a plurality of tether attachment points on said mounting bar, said tether attachment points further comprising holes defined by said mounting bar; and tether retaining means for attachment to said child safety seat by a tether and thereby attachable to any of said tether attachment points, said tether retaining means comprising a loop, said seat operatively connected to said bar;

wherein each said upper member defines a groove and each said lower member defines a groove such that when said upper member and said lower member are connected a generally oval shape is formed.

7. A child seat tether system comprising a child safety seat;

a mounting bar;

first and second mounting brackets connected to said mounting bar, said brackets capable of connecting to preexisting seat attachment points of a vehicle floor;

a plurality of tether attachment points on said mounting bar;

tether retaining means attachable to any of said attachment points, for operatively connecting said child safety seat to said bar by a tether;

said mounting brackets each further comprising an upper member, a lower member and a plurality of bolts for connecting said members; and each said upper member defining a groove and each said lower member defining a groove such that when said upper member and said lower member are connected a generally oval shape is formed.

8. A child safety tether system comprising:

a child safety seat;

a mounting bar;

first and second mounting brackets connected to said mounting bar, said brackets capable of connecting to preexisting seat attachment points of a vehicle floor, said mounting brackets each including an upper member, a lower member and a plurality of bolts for connecting said members;

a plurality of tether attachment points on said mounting bar, said tether attachment points further comprising holes defined by said mounting bar;

tether retaining means attachable to any of said attachment points, for operatively connecting said child safety seat to said bar by a tether;

wherein each said upper member defines a groove and each said lower member defines a groove such that when said upper member and said lower member are connected a generally oval shape is formed.

9. A child seat tether system comprising:

a child safety seat;

a mounting bar;

first and second mounting brackets connected to said mounting bar, said brackets capable of connecting to preexisting seat attachment points of a vehicle floor, said mounting brackets each further comprising an upper member, a lower member and a plurality of bolts for connecting said members;

a plurality of tether attachment points on said mounting bar, said tether attachment points further comprising holes defined by said mounting bar;

tether retaining means attachable to any of said attachment points, said tether retaining means comprising a loop, for operatively connecting said child safety seat to said bar by a tether; and each said upper member defining a groove and each said lower member defining a groove such that when said upper member and said lower member are connected a generally oval shape is formed.

10. A method for securing a child seat comprising the steps of:

providing a tether;

providing a mounting bar comprising first and second mounting brackets said brackets capable of connecting to preexisting seat attachment points of a vehicle floor, said mounting bar further comprising a plurality of tether attachment points on said mounting bar;

providing tether retaining means attachable to one of said tether attachment points;

connecting said tether to said child seat and to said tether retaining means;

connecting said tether retaining means to said mounting bar via one of said tether attachment points;

connecting said mounting bar to said vehicle floor via said mounting brackets;

said mounting brackets further comprising an upper member, a lower member and a plurality of bolts for connecting said members; and each said upper member defining a groove and each said lower member defining a groove such that when said upper member and said lower member are connected a generally oval shape is formed.

11. A method for securing a child seat comprising the steps of:

providing a tether;

providing a mounting bar comprising first and second mounting brackets said brackets capable of connecting to preexisting seat attachment points of a vehicle floor, said mounting bar further comprising a plurality of tether attachment points on said mounting bar, said mounting brackets each including an upper member, a lower member and a plurality of bolts for connecting said members;

providing tether retaining means attachable to any of said tether attachment points;

said tether attachment points further comprising holes defined by said mounting bar;

connecting said tether to said child seat and to said tether retaining means;

connecting said tether retaining means to said mounting bar via one of said tether attachment points;

connecting said mounting bar to said vehicle floor by connecting said mounting brackets to said seat attachment points; and said upper member defining a groove and said lower member defining a groove such that when said upper member and said lower member are connected a generally oval shape is formed.

* * * * *